(12) United States Patent
Brown et al.

(10) Patent No.: US 12,534,074 B1
(45) Date of Patent: Jan. 27, 2026

(54) OBJECT DETECTION USING MERGED SENSOR DATA CLUSTERS

(71) Applicant: Zoox, Inc., Foster City, CA (US)

(72) Inventors: Kenneth Nathan Brown, San Carlos, CA (US); Vincent Chee-Chin Lee, San Francisco, CA (US); David Benjamin Lu, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 97 days.

(21) Appl. No.: 18/621,833

(22) Filed: Mar. 29, 2024

(51) Int. Cl.
*B60W 30/09* (2012.01)
*B60W 50/14* (2020.01)
*B60W 60/00* (2020.01)
*G01S 13/89* (2006.01)
*G01S 17/89* (2020.01)
*G06V 20/58* (2022.01)

(52) U.S. Cl.
CPC ............ *B60W 30/09* (2013.01); *B60W 50/14* (2013.01); *B60W 60/001* (2020.02); *G01S 13/89* (2013.01); *G01S 17/89* (2013.01); *G06V 20/58* (2022.01); *G06V 2201/07* (2022.01)

(58) Field of Classification Search
CPC .... B60W 30/09; B60W 30/001; B60W 50/14; G01S 13/89; G01S 17/89; G06V 20/58
See application file for complete search history.

(56) References Cited

U.S. PATENT DOCUMENTS

| | | | |
|---|---|---|---|
| 2017/0031015 A1* | 2/2017 | Mei .................... | G01S 13/931 |
| 2019/0220013 A1* | 7/2019 | Bradley ................ | B60N 2/00 |
| 2022/0215756 A1* | 7/2022 | Becker ................ | G06V 10/762 |
| 2023/0139772 A1* | 5/2023 | Wang .................. | G06N 3/08 |
| | | | 345/419 |

\* cited by examiner

*Primary Examiner* — Tan Q Nguyen
(74) *Attorney, Agent, or Firm* — Lee & Hayes, P.C.

(57) ABSTRACT

Techniques for object detection based on sensor data are discussed herein. In some cases, the techniques described herein include determining that a first sensor data cluster and a second sensor data cluster are associated with the same object if the two clusters satisfy a set of conditions. For example, a condition may be defined based on at least one of: (i) whether the second cluster is within an azimuth range associated with the first cluster, (ii) whether a height difference associated with the two clusters falls below a threshold, (iii) whether an aspect ratio associated with a combination of the two clusters is acceptable (e.g., satisfies at least one of one or more predefined aspect ratio conditions, falls within one of one or more predefined aspect ratio ranges, and/or the like), and/or (iv) whether cluster tracks associated with the two clusters jointly move across time.

20 Claims, 5 Drawing Sheets

OBJECT DETECTION USING MERGED SENSOR DATA CLUSTERS

BACKGROUND

Autonomous vehicles perform computer vision operations such as object detection. However, computer vision operations can be inaccurate and/or inefficient, which can present challenges when controlling the autonomous vehicle through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
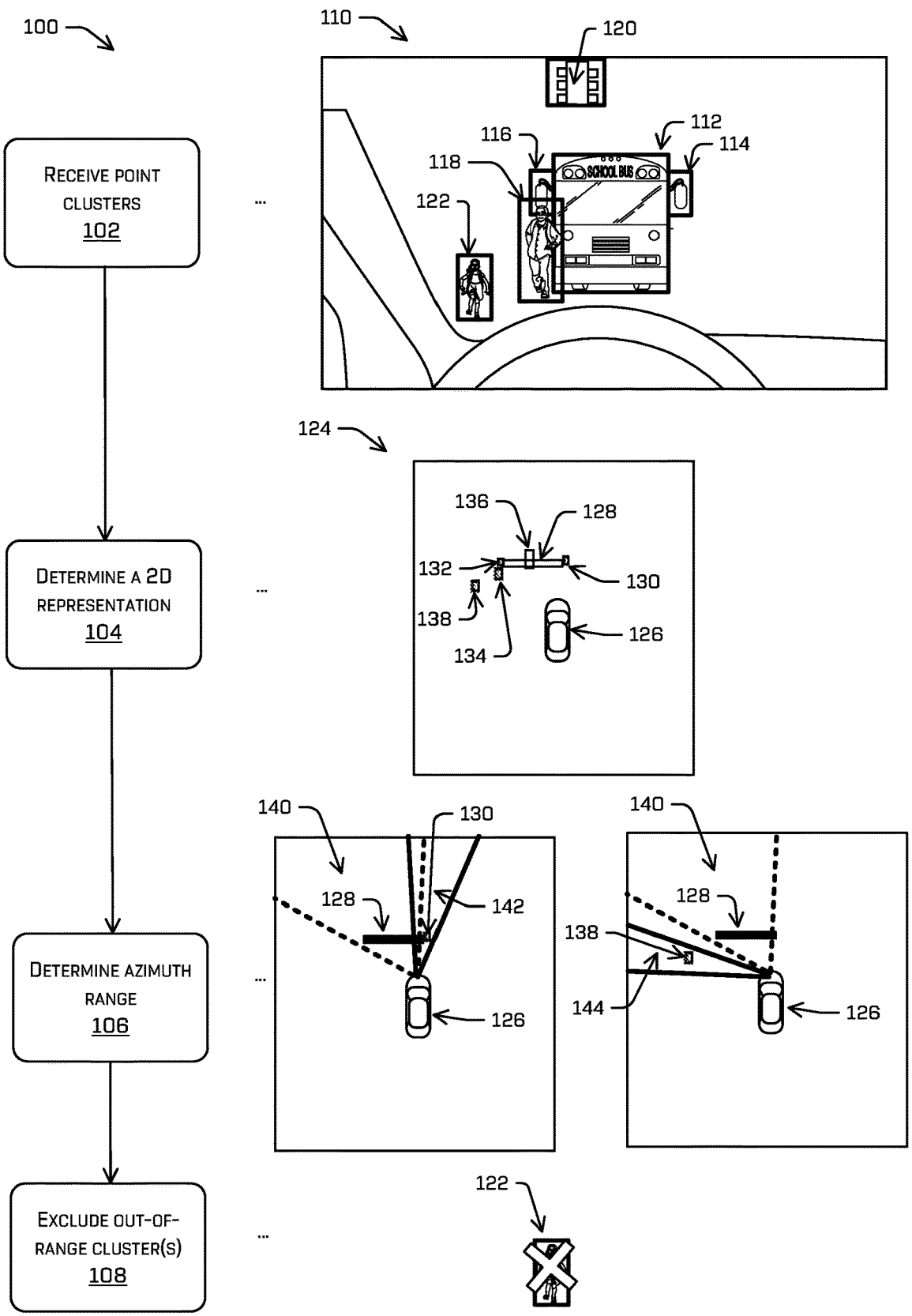
FIG. 1 is a flowchart diagram of an example process for determining which secondary clusters are ineligible for merger with a primary cluster based on an azimuth range associated with the primary cluster.

This disclosure describes techniques for determining whether two or more sensor data point clusters (e.g., lidar point clusters) are associated with the same object. In some cases, the techniques described herein enable determining that a first sensor data point cluster and a second sensor data point cluster are associated with the same object if: (i) the second cluster is within an azimuth range associated with the first point cluster, (ii) a height difference associated with the first cluster and the second cluster falls below a threshold, and/or (iii) an aspect ratio associated with a combination of the two clusters satisfies one of a set of acceptable aspect ratio conditions (e.g., falls within an acceptable aspect ratio range). In some cases, the techniques described herein enable improved object detection based on lidar data. The improved object detection may enable controlling a vehicle in a safer manner based on a more accurate detection of object(s) in the vehicle's environment. Accordingly, the techniques discussed herein may improve the safety of occupants of an autonomous vehicle that incorporates the techniques discussed herein. Moreover, the techniques may improve the efficiency of an autonomous vehicle in accomplishing a mission such as, for example, delivering passengers and/or cargo, surveying a region, and/or the like.

In some cases, the techniques described herein enable determining a likelihood that two or more clusters determined based on lidar data are associated with the same object. However, while various implementations of the techniques disclosed herein are described with reference to point clusters determined based on lidar data, a person of ordinary skill in the relevant technology will recognize that the techniques described herein may be performed in relation to point clusters determined based on other types of sensor data, such as at least one of radar data, image data, sonar data, or depth camera output data. In some cases, the techniques described herein may enable determining that a first point cluster determined based on first sensor data associated with a first sensor modality and a second point cluster determined based on second sensor data associated with a second sensor modality are associated with the same object. In some cases, the first sensor data associated with the first sensor modality and the second sensor data associated with the second sensor modality are associated with the same time (e.g., with the same timestamp, such as with the same capturing timestamp and/or receipt time; with the same period of time; and/or the like).

In some cases, the techniques described herein include determining that a first point cluster and a second point cluster are associated with the same object if the two clusters satisfy a set of conditions. For example, a condition may be defined based on at least one of: (i) whether the second cluster (e.g., a position associated with the cluster, such as a centroid of the cluster) is within an azimuth range associated with the first cluster, (ii) whether a height difference associated with the two clusters falls below a threshold, (iii) whether an aspect ratio associated with a combination of the two clusters is acceptable (e.g., satisfies at least one of one or more predefined aspect ratio conditions, falls within one of one or more predefined aspect ratio ranges, and/or the like), or (iv) whether cluster tracks associated with the two clusters jointly move across time.

In some cases, the techniques described herein may include determining a point cluster based on lidar data associated with an environment. A point cluster may be a set of sensor data points that are grouped using one or more clustering routines. A sensor data point may include one or more sensor data values that are associated with a defined portion of an environment, such as one or more sensor data values that are associated with a position (e.g., a voxel) in the environment. For example, a lidar scan may include one or more measured lidar values.

In some cases, an example system receives lidar data captured by a lidar sensor associated with a vehicle. The lidar sensor may be configured to capture data across time via one or more lidar scans. Each lidar scan may represent lidar data associated with a full field of view (FOV) of the sensor at a point in time, such as lidar data associated with a 360-degree view from the sensor's perspective. In some cases, a lidar point may be associated with one or more lidar values associated with a defined portion of an environment, such as one or more lidar values associated with a voxel in the environment.

In some cases, a sensor data point is associated with a point track. A point track may include a set of sensor data points that are determined to be associated with a common portion of an object (or representation thereof—e.g., a centroid) across two or more times (e.g., are determined to be aligned with each other). In some cases, a point track may include a first sensor data point that is determined to be associated with a particular portion of a vehicle at a first time and a second sensor data point that is determined to be associated with the same vehicle portion at a second time. For example, the first sensor data point may include a set of values associated with a first lidar scan that are determined to be associated with the particular vehicle portion, while the second sensor data point may include a set of values associated with a second lidar scan that are determined to be associated with the same vehicle portion. Accordingly, a point track determined based on lidar data may associate two or more lidar points determined to represent the same location across a sequence of scans.

In some cases, determining a point track includes determining that two or more sensor data points associated with two or more times are associated with a common portion of an object. In some cases, determining that a first point in the first sensor data associated with a first time and a second point in the second sensor data associated with a second point are associated with the same location is based on at least one of: (i) a position (e.g., coordinate(s)) associated with the first sensor data point in the first sensor data, (ii) a position associated with the second sensor data point in the second sensor data, or (iii) a change in a location of the sensor used to capture the first sensor data and/or the second sensor data between the first and the second time. The change in the sensor location may, for example, be determined based on location and/or localization data (e.g., global positioning system (GPS) data, localizer as described herein, etc.) reported by a vehicle associated with the sensor.

In some cases, to determine a point cluster, the system maps a set of sensor data points onto a multi-dimensional space and then processes the mappings using one or more clustering operations. For example, a sensor data point may be mapped onto a multi-dimensional clustering space based on at least one of: (i) a location (e.g., a voxel location) associated with the sensor data point, (ii) a position (e.g., coordinate(s)) associated with the sensor data point within the sensor data associated with a corresponding time, (iii) one or more sensor data values (e.g., lidar value(s)) associated with the sensor data point, (iv) one or more features describing a shift in the position of a point track associated with the sensor data point across two or more times, and (v) one or more features representing whether the sensor data point is occluded or non-occluded. Examples of clustering algorithms include Density-Based Spatial Clustering of Applications with Noise (DBSCAN), k-means clustering, mean-shift clustering, Ordering Points to Identify the Clustering Structure (OPTICS), and/or the like.

In some cases, to determine a point cluster, the system processes sensor data associated with a particular time (e.g., lidar data associated with a lidar scan) using one or more machine learning models (e.g., one or more supervised machine learning models), such as at least one of an object detection model, an object classification model, or a sensor data segmentation model. Examples of object detection models are described in US Pat. App. Pub. No. 2021/0181758, filed on Jan. 31, 2020, and entitled "Object Detection and Tracking," which is incorporated by reference herein in its entirety and for all purposes. In some cases, a point cluster may include all of the sensor data points that are determined by the machine learning model(s) to be associated with a common object and/or segment of the environment.

In some cases, a point cluster is associated with a cluster track. A cluster track may include a set of point clusters that are determined to be associated with the object across two or mor times. In some cases, determining that a first cluster and a second cluster determined based on the sensor data associated with two different times are associated with the same location is based on at least one of: (i) a position (e.g., coordinate(s)) associated with the first cluster (e.g., with a centroid of the first cluster) in the first sensor data associated with the first time, (ii) a position associated with the second cluster (e.g., with a centroid of the second cluster) in the second sensor data associated with the second time, or (iii) a change in a location of the sensor used to capture the first sensor data and/or the second sensor data between the first and the second time. Example techniques for tracking clusters across time (e.g., for determining that a first cluster and a second cluster determined based on the sensor data associated with two different times are associated with the same location) are described in U.S. patent application Ser. No. 18/500,030, filed on Nov. 1, 2023 and entitled "Objection Detection using Cluster Tracking," which is incorporated by reference herein in its entirety and for all purposes.

In some cases, the techniques described herein include determining whether one point cluster falls within an azimuth range of another point cluster. In some cases, to determine whether a second cluster falls within an azimuth range of a first cluster, the system first determines the azimuth range associated with the first cluster and then determines whether the second cluster falls within the azimuth range. An azimuth range may represent a range of angles in a two-dimensional plane associated with the environment. The two-dimensional plane may include a horizontal plane parallel to the ground and/or a two-dimensional plane associated with a top-down view of the environment.

In some cases, to determine an azimuth range associated with a cluster, the system projects the cluster onto a two-dimensional plane, such as a two-dimensional plane associated with a top-down representation of the environment. For example, the cluster may include a group of three-dimensional points. The system may map at least a subset (e.g., each) of those three-dimensional points onto the two-dimensional plane. To map a three-dimensional point to a two-dimensional plane, the system may use two of the coordinates of the point while ignoring the third coordinate. For example, given a point $(x_1, y_1, z_1)$, the system may map this point onto the two-dimensional point $(x_1, y_1)$. Accordingly, the system may ignore the z-coordinate value associated with the three-dimensional point. In some cases, after the system maps at least a subset (e.g., each) of the three-dimensional points associated with a cluster onto corresponding two-dimensional points, the system may determine the projection of the cluster based on a region of the two-dimensional plane that includes the projected two-dimensional points.

Accordingly, in some cases, the system may map a point cluster onto a region of a two-dimensional plane associated with the corresponding environment. A two-dimensional plane associated with an environment may include a top-down plane, such as a top-down plane whose origin location is determined based on a sensor location and/or a vehicle location. For example, the two-dimensional plane may include a top-down representation of the environment in which a lidar sensor location and/or a vehicle location is determined as an origin point.

In some cases, after the system maps a three-dimensional point cluster onto a two-dimensional cluster, the system determines an azimuth range associated with the three-dimensional cluster based on the projected two-dimensional cluster. In some cases, to determine the azimuth range based on a two-dimensional cluster, the system: (i) determines a source location (e.g., the origin location) in the two-dimensional plane, (ii) determines two intersection locations in the two-dimensional plane based on a location of the two-dimensional cluster, (iii) casts a first ray that intersects with (e.g., passes) the source location and the first intersection location, (iv) casts a second ray that intersects with the source location and the second intersection location, and (v) determines the range of angles that fall within the two rays as the azimuth range. The intersection locations may be determined based on two sides of the cluster. In some cases, the intersection locations may be determined based on two positions that have a defined offset distance with respect to two positions associated with two sides of the cluster.

Accordingly, to determine the azimuth range associated with a two-dimensional cluster, the system casts two azimuth range rays. Both azimuth range rays may intersect with (e.g., originate from) the same source location. The source location may, for example, be an origin location of the two-dimensional plane, such as an origin location determined based on a projected vehicle location and/or a projected sensor location in the two-dimensional plane. A first azimuth range may intersect with the source location and a first intersection location. In some cases, the first intersection location is determined based on a two-dimensional point in the two-dimensional cluster that is associated with a lowest x-coordinate value (e.g., the "left-most" point of the cluster). For example, the first intersection location may be the point with the lowest x-coordinate value or may be determined by subtracting an offset from the lowest x-coordinate value. In some cases, the first intersection location is determined based on a two-dimensional point in the two-dimensional cluster that is associated with a lowest y-coordinate value (e.g., the "bottom-most" point of the cluster). For example, the first intersection location may be the point with the lowest y-coordinate value or may be determined by subtracting an offset from the lowest y-coordinate value. The absolute values for the offset(s) may be determined based on the size of the two-dimensional plane and/or the size of the cluster. For example, in some cases, the bigger the cluster, the bigger the offset(s) associated with the cluster. As another example, the bigger the two-dimensional plane, the bigger the offset(s) associated with rays cast in that two-dimensional plane. In some cases, the absolute values for the offset(s) may be determined based on factors such as the expected size of object(s) in the environment, the resolution of the sensor(s) used to determine the cluster(s), and/or the desired margin of safety around detected object(s).

A second azimuth range ray may intersect with the source location and a second intersection location. In some cases, the second intersection location is determined based on a two-dimensional point in the two-dimensional cluster that is associated with a highest x-coordinate value (e.g., the "right-most" point of the cluster). For example, the second intersection location may be the point with the highest x-coordinate value or may be determined by subtracting an offset from the highest x-coordinate value. In some cases, the second intersection location is determined based on a two-dimensional point in the two-dimensional cluster that is associated with a highest y-coordinate value (e.g., the "top-most" point of the cluster). For example, the second intersection location may be the point with the highest y-coordinate value or may be determined by subtracting an offset from the highest y-coordinate value. Example techniques for determining the offset(s) used to determine an azimuth range are described above.

In some cases, the azimuth range associated with a two-dimensional cluster may be determined based on four azimuth range rays. Each azimuth range ray may originate from a common position (e.g., determined based on a sensor location) and intersect with a position associated with a side and/or corner of the two-dimensional cluster. In some cases, the azimuth range associated with a two-dimensional cluster is determined based on N (e.g., two, four, and/or the like) azimuth range rays. An azimuth range ray may originate from a defined position (e.g., determined based on a sensor location). An azimuth range may intersect with a position associated with the two-dimensional cluster (e.g., a position associated with one of N sides and/or N corners of the two-dimensional cluster, such as a position that has an offset distance and/or a buffering distance with a position associated with one of N sides and/or N corners of the two-dimensional cluster).

In some cases, after determining a first azimuth range associated with a first cluster, the system determines whether the second cluster is associated with first azimuth range. In some cases, the system determines that the second cluster is associated with the first azimuth range if a position and/or region associated with the second cluster (e.g., a second azimuth range determined based on intersection location(s) associated with the second cluster, a centroid of the second azimuth range, and/or the like) falls on a position and/or within a region associated with the first azimuth range (e.g., falls within the first azimuth range, intersects with the first azimuth range, includes at least a threshold number and/or a threshold ratio of points that fall within the first azimuth range, has a shortest distance to the first azimuth range that falls below a threshold and/or the like). In some cases, to determine whether a second cluster is associated with the first azimuth range, the system projects the second cluster onto the two-dimensional plane associated with the azimuth range, for example using the cluster projection techniques described above. After projecting the second cluster onto the two-dimensional plane, the system may determine whether a threshold number and/or ratio (e.g., all) of a second azimuth range determined based on the projected cluster falls within the first azimuth range.

In some cases, the system determines a first azimuth range associated with a first cluster and a second azimuth range associated with a second cluster. In some cases, the system determines that the second cluster is associated with the first azimuth range if a measure of distance associated with the two azimuth ranges falls below a threshold. For example, the system may determine that a measure of distance associated with the two azimuth ranges falls below a threshold if: (i) a threshold ratio and/or a threshold number of points in one of the two azimuth ranges falls within the other azimuth range, and/or (ii) if a shortest distance between points in the two azimuth ranges falls below a threshold. An azimuth range associated with a cluster may intersect with intersection points associated with that cluster. An intersection point associated with a cluster may be a point that is on a boundary of the cluster and/or that has a defined offset distance from a point on the cluster boundary.

For example, in some cases, the system may determine that a projected two-dimensional cluster is associated with an azimuth range if at least one projected point associated with the cluster falls within the range. As another example, in some cases, the system may determine that a projected two-dimensional cluster is associated with an azimuth range if at least a threshold number of projected points associated with the cluster fall within the range. As another example, in some cases, the system may determine that a projected two-dimensional cluster is associated with an azimuth range if one or more particular points (e.g., a centroid point, all median x-coordinate points, all median y-coordinate points, and/or the like) associated with the cluster fall within the range. As another example, in some cases, the system may determine that a projected two-dimensional cluster is associated with an azimuth range if a threshold ratio (e.g., fifty percent, eighty percent, one hundred percent, and/or the like) of the projected points associated with the cluster fall within the range.

In some cases, to determine whether a second cluster is associated with the azimuth range associated with the first cluster, the system: (i) determines a first azimuth range associated with the first cluster, (ii) determines a second azimuth range associated with the second cluster, and (iii) determines whether a measure of distance associated with the two azimuth ranges falls below a threshold (e.g., whether a threshold ratio and/or number of points in the second azimuth range fall within the first azimuth range). For example, the system may cast two rays based on location(s) associated with the first cluster. These two rays may include a first ray with an angle of $\theta_1$ with respect to a reference line of the plane (e.g., with respect to the positive x-coordinate axis) and a second ray with an angle $\theta_2$ with respect to the reference line, where $\theta_2 > \theta_1$. Moreover, the system may cast two rays based on location(s) associated with the second cluster. These two rays may include a third ray with an angle of $\theta_3$ with respect to the reference line of the plane and a fourth ray with an angle $\theta_4$ with respect to the reference line. The system may then determine that the second cluster falls within the azimuth range of the first cluster if both $\theta_3$ and $\theta_4$ fall within the interval $[\theta_1, \theta_2]$ and/or the interval $(\theta_1, \theta_2)$.

In some cases, the system may determine that two clusters are associated with the same object based at least in part on determining that one of the two clusters is within an azimuth range of the other cluster. This may enable the system to determine, for example, that a truck and its truck bed should be considered a single object, even if there is some spatial separation between the truck cluster and the truck bed cluster. By recognizing that the truck bed cluster falls within the azimuth range of the truck cluster from the perspective of the sensor, the system may reasonably infer that two clusters are part of the same object. Similarly, the azimuth range technique may enable the system to group together clusters representing different parts of a large vehicle, such as a tractor-trailer. The trailer cluster may be partially or fully within the azimuth range of the tractor cluster, which may indicate that two clusters are associated with the same object.

In some cases, the system may determine that two clusters are associated with the same object based on determining that at least one of the following is satisfied: (i) that the first cluster falls within the azimuth range associated with the second cluster, or (ii) that the second cluster falls within the azimuth range associated with the first cluster. In some cases, the system may determine that two clusters are associated with the same object based on determining both of the following is satisfied: (i) that the first cluster falls within the azimuth range associated with the second cluster, and (ii) that the second cluster falls within the azimuth range associated with the first cluster.

In some cases, two clusters may be associated with two different objects even if one of the clusters falls within the azimuth range of the other and/or if a threshold number of clusters (e.g., each cluster) fall within the other's azimuth range. For example, in the case of a traffic light above a vehicle, the traffic light cluster may be within an azimuth range of the vehicle cluster. As another example, in the case of a pedestrian standing next to a vehicle, the pedestrian cluster may be within an azimuth range of the vehicle cluster. Accordingly, in some cases, even if one cluster is within another cluster's azimuth range, the system may require that one or more conditions be satisfied before determining that the two clusters are associated with the same object. For example, the system may require that, in addition to one cluster being within the azimuth range of another cluster, the height difference associated with the two clusters falls below a threshold and/or an aspect ratio associated with a combination of the two clusters is acceptable.

In some cases, the techniques described herein include determining whether a height difference associated with two clusters falls below a threshold. In some cases, the system may: (i) determine a height difference associated with the two clusters, (ii) determine a threshold height difference, and (iii) determine whether the height difference falls below the determined threshold. In some cases, to determine a height difference associated with two clusters, the system may: (i) determine a first height value associated with the first cluster, (ii) determine a second height value associated with the second cluster, and (iii) determine a measure of deviation of the two height values.

In some cases, a cluster's height value is determined based on a height value associated with a particular location (e.g., a centroid location) associated with the cluster. In some cases, a cluster's height value is determined based on a median and/or a mean associated with the height values associated with the points in the cluster. In some cases, a cluster's height value is determined based on a minimum height associated with the cluster (e.g., the height associated with the "bottom" point of the cluster) and/or a maximum height (the height associated with the "top" point of the cluster). For example, in some cases, if a first cluster is determined to have a higher height level relative to a second cluster (e.g., the first cluster is the "upper" cluster and the second cluster is the "lower" cluster), then the height value associated with the first cluster may be the minimum height of the first cluster and the height value associated with the second cluster may be the maximum height of the second cluster.

Accordingly, in some cases, if a first cluster is determined to have a higher height level relative to a second cluster, the height difference associated with the two clusters may be determined based on a difference between the minimum height associated with the first cluster and the maximum height associated with the second cluster. For example, in the case of a traffic light above a vehicle, the height difference associated with the vehicle cluster and the traffic light cluster may be the difference between the minimum height associated with the traffic light cluster and the maximum height associated with the vehicle cluster.

In some cases, a first cluster is determined to have a higher height level relative to a second cluster if the maximum height of the first cluster exceeds the maximum height of the second cluster. In some cases, a first cluster is determined to have a higher height level relative to a second cluster if the height of the first cluster's centroid exceeds the maximum height of the second cluster's centroid. In some cases, a first cluster is determined to have a higher height level relative to a second cluster if the median height of the first cluster exceeds the median height of the second cluster. In some cases, a first cluster is determined to have a higher height level relative to a second cluster if the mean height of the first cluster exceeds the mean height of the second cluster.

In some cases, after the system determines a height difference associated with two clusters, the system determines whether the height difference falls below a threshold. In some cases, the threshold may be a predefined value. In some cases, the threshold may be determined based on a resolution of the sensor used to determine the clusters. In some cases, the threshold may be determined based on a measure of distance of the sensor from one or both of the clusters. This may be because sensor vertical resolution is expected to decrease with increasing distance from the sensor.

In some cases, the system may determine whether two clusters are associated with the same object based at least in part on whether the height difference associated with the two clusters falls below a threshold. For example, the system may determine that a vehicle and a bike rack on top of the vehicle are associated with the same object based at least in part on determining the height difference associated with the vehicle cluster and the bike rack cluster falls below a threshold. As another example, the system may determine that a vehicle and a traffic light are not associated with the same object based at least in part on determining that the height difference associated with the vehicle cluster and the traffic light cluster meets or exceeds a threshold.

In some cases, the system determines that a height difference associated with two clusters falls below a threshold if an elevation angle associated with the two clusters falls below a threshold. The elevation angle may be an angle between a vector associated with the two clusters and a two-dimensional plane (e.g., a two-dimensional plane that is parallel to the ground surface). The vector may be a vector that intersects with two points associated with the two clusters (e.g., the centroid of the two clusters).

In some cases, the techniques described herein include determining whether an aspect ratio associated with a combination of two or more clusters satisfies one of a set of aspect ratio conditions. The aspect ratio may define a ratio of two or more geometric properties associated with a hypothetical object that includes the two or more clusters. Examples of geometric properties include height, width, and/or length. In some cases, an aspect ratio associated with two clusters is determined based on an aspect ratio associated with a three-dimensional region that includes at least a portion (e.g., all) of the first cluster and at least a portion (e.g., all) of the second cluster. In some cases, an aspect ratio associated with two clusters is determined based on an aspect ratio associated with a two-dimensional region that includes at least a portion (e.g., all) of a two-dimensional representation (e.g., a top-down representation) of the first cluster and at least a portion (e.g., all) of a two-dimensional representation (e.g., a top-down representation) of the second cluster.

In some cases, the aspect ratio conditions define acceptable ranges for aspect ratios associated with clusters. In some cases, the aspect ratio conditions define acceptable ranges of ratios of geometric feature ratios for a set of objects. For example, an aspect ratio condition may define acceptable ranges of widths, lengths, and/or heights associated with sedan vehicles. As another example, an aspect ratio condition may define acceptable ranges of widths, lengths, and/or heights associated with sedan vehicles with trailers. As another example, an aspect ratio condition may define acceptable ranges of widths, lengths, and/or heights associated with truck vehicles. As another example, an aspect ratio condition may define acceptable ranges of widths, lengths, and/or heights associated with bus vehicles. As another example, an aspect ratio condition may define acceptable ranges of widths, lengths, and/or heights associated with pedestrians. As another example, an aspect ratio condition may define acceptable ranges of widths, lengths, and/or heights associated with roadway signs. As another example, an aspect ratio condition may define acceptable ranges of widths, lengths, and/or heights associated with traffic lights.

In some cases, an aspect ratio condition may define a range for a geometric property based on a static value. For example, an aspect ratio condition may define that a vehicle may have a width between 1.5 meters and 2.5 meters, a length between 3.5 meters and 5.5 meters, and a height between 1.4 meters and 2.0 meters. These static values may define thresholds used to determine if a combination of clusters falls within the acceptable range for a particular object category.

In some cases, an aspect ratio condition may define a range for a geometric property based on a dynamic value that depends on one or more other geometric properties. For example, an aspect ratio condition for a sedan vehicle may define that the length should be between 2.5 and 4 times the width, and the height should be between 0.5 and 0.8 times the width. These dynamic ranges may define acceptable proportional relationships between different dimensions of objects corresponding to a particular object category.

In some cases, to determine whether a combination of clusters satisfies an aspect ratio condition, the system may compute the geometric properties of a hypothetical object formed by the clusters. This may involve determining the bounding box that encompasses all the clusters and extracting the width, length, and/or height of the bounding box. The computed geometric properties can then be used to determine an aspect ratio, and the aspect ratio can be compared against the acceptable ranges defined by the aspect ratio conditions.

In some cases, given a first cluster, the system may first identify one or more second clusters that are candidates for merger with the first cluster based on one or more other merger conditions (e.g., based on merger condition(s) associated with azimuth range(s) and/or height difference(s)). The system may then determine a set of combinations of the first cluster and at least a subset of the second clusters. Each combination may include the first cluster and one or more of the second clusters. The system may then determine a subset of the combinations that each satisfy at least one aspect ratio condition. The system may then select one of the combinations in the subset and merge the clusters associated with the selected combination. In examples, the system may select the combination that is associated with the highest area as the selected combination.

For example, given a cluster associated with a vehicle, a cluster associated with the vehicle's exhaust, a cluster associated with a bike rack on top of the vehicle, and a cluster associated with a pedestrian next to the vehicle, the system may first determine that all four clusters are candidates for merger. The system may then determine that each of the following cluster combinations satisfies at least one aspect ratio condition: (i) a first combination associated with the vehicle cluster and the bike rack cluster, (ii) a second combination associated with the vehicle cluster and the exhaust cluster, and (iii) a third combination associated with the vehicle cluster, the bike rack cluster, and the exhaust cluster. The system may further determine that any combinations associated with the pedestrian cluster do not satisfy any aspect ratio conditions. The system may then determine the third combination as the selected cluster used for cluster merger, for example by determining that the third combination is associated with the largest area.

In some cases, given a first cluster, the system may first identify C second clusters that are candidates for merger with the first cluster based on one or more other merger conditions (e.g., based on merger condition(s) associated with azimuth range(s) and/or height difference(s)). The system may then determine C combinations, where each combination may include the first cluster and one of the C second clusters. The system may then determine a subset of the C combinations that each satisfy at least one aspect ratio conditions. The system may then merge the first cluster with each second cluster associated with a combination in the determined subset.

For example, given a cluster associated with a vehicle, a cluster associated with the vehicle's exhaust, a cluster associated with a bike rack on top of the vehicle, and a cluster associated with a pedestrian next to the vehicle, the system may first determine that all four clusters are candidates for merger. The system may determine that each of the following cluster combinations satisfies at least one aspect ratio condition: (i) a first combination associated with the vehicle cluster and the bike rack cluster, and (ii) a second combination associated with the vehicle cluster and the exhaust cluster. The system may further determine that a third combination associated with the vehicle cluster and the pedestrian cluster fails to satisfy any aspect ratio conditions. Based on these determinations, the system may determine to combine the vehicle cluster with the bike rack cluster and the exhaust cluster, as these two clusters are associated with the combinations with the "acceptable" aspect ratios.

In some cases, the techniques described herein include determining whether two clusters are associated with the same object. In some cases, the system may determine that two clusters are associated with the same object based on at least one of: (i) whether one of the two clusters falls within an azimuth range associated with the other cluster, (ii) whether a height difference associated with the two clusters falls below a threshold, or (iii) whether an aspect ratio of a combination associated with the two clusters satisfies an aspect ratio condition. For example, in some cases, the system may determine that two clusters are associated with the same object if all of the following are satisfied: (i) one of the two clusters falls within an azimuth range associated with the other cluster, (ii) a height difference associated with the two clusters falls below a threshold, or (iii) an aspect ratio of a combination associated with the two clusters satisfies an aspect ratio condition.

In some cases, the system may determine whether two clusters are associated with the same object based on whether two cluster tracks associated with the two clusters move jointly across two or more times. In some cases, if two cluster tracks associated with two clusters do not move jointly across two or more times, the system may determine that the two clusters are not associated with the same object. In some cases, if two cluster tracks associated with two clusters move jointly across two or more times, the system may determine that the two clusters are associated with the same object. In some cases, if two cluster tracks associated with two clusters move jointly across two or more times, the system may increase the likelihood that the two clusters are associated with the same object.

In some cases, the cluster-based object detections performed in accordance with the techniques described herein may be used to control a vehicle. In some cases, the techniques herein enable more accurate object detection in a vehicle's environment, which can lead to safer trajectory planning for the vehicle. Accordingly, in some cases, the techniques described herein enable better modeling of a vehicle's environment and controlling the vehicle in a safer manner based on those more accurate vehicle environment models.

Additionally, in some cases, the techniques discussed herein can be implemented to facilitate and/or enhance safety of automated navigation features in vehicles, such as in automated vehicles or semi-automated vehicles. For example, the techniques described herein can be used to detect a dynamic object in a vehicle's environment and determine that a current trajectory of the vehicle is likely to collide with a predicted trajectory of the detected dynamic object. Upon determining that the current trajectory is likely to collide with the dynamic object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques discussed herein can be implemented in a multi-sensor system, such as a multi-sensor system including image sensor(s) (e.g., red-green-blue (RGB) cameras), depth cameras (e.g., RGB-D cameras (e.g., time-of-flight cameras)), lidar sensors, radar sensors, and/or sonar sensors, to provide redundancy to the system in the event of hardware or software failure. For example, in the event that an image sensor is broken, the techniques described herein enable object detection based on lidar data only. Thus, the techniques discussed herein provide additional improvements to computer vision systems, for example.

In some cases, the techniques described herein can be implemented to provide redundancy for an object detection model used by a vehicle. The object detection model may, for example, be a classifier model and/or a segmentation model, such as a classifier and/or segmentation model that is configured to perform object classification and/or object segmentation based on sensor data (e.g., based on lidar data). In some cases, the techniques described herein provide an alternative mechanism for detecting objects based on sensor data (e.g., based on lidar). Accordingly, these techniques described herein may provide redundancy in the event of failure of the default object detection model used by a vehicle computing device, and thus enhance safety and operational reliability of the vehicle computing device that uses both frameworks for object detection.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Further, although described in connection with lidar data, the methods, apparatuses, and systems described herein are not limited to lidar. In one example, the methods, apparatuses, and systems may be utilized to perform computer vision operations on one or more of radar frames, depth camera frames, or image data frames. Moreover, although various computer vision operations are described as being performed by a perception component of a vehicle computing device, a person of ordinary skill in the relevant technology will recognize that the perception component may be deployed on other computing devices, such as on a remote computing device that communicates with a vehicle computing device using a networked connection.

FIG. 1 is a flowchart diagram of an example process 100 for determining which secondary clusters are ineligible for merger with a primary cluster based on an azimuth range associated with the primary cluster. As used herein, merging two clusters includes determining that the two clusters are associated with the same object.

As depicted in FIG. 1, at operation 102, an example system receives a set of point clusters. A point cluster may include a set of sensor data points that are grouped together, for example using one or more clustering algorithms. For example, as depicted in FIG. 1, the set of clusters 110 includes the vehicle cluster 112 as the primary cluster. As further depicted in FIG. 1 the secondary clusters include the right mirror cluster 114, the left mirror cluster 116, the proximate pedestrian cluster 118, the traffic light cluster 120, and the distant pedestrian cluster 122. The system may use process 100 to determine which, if any, of these secondary clusters to exclude from the set of secondary clusters that are eligible for merger with the vehicle cluster 112.

At operation 104, the system projects the clusters onto a two-dimensional representation of the environment. The two-dimensional representation may be a top-down representation of the environment, such as a top-down representation whose origin location is determined based on the location of a sensor and/or vehicle used to determine the sensor data.

For example, as depicted in FIG. 1, the two-dimensional representation 124 is a top-down representation of the environment. The origin point 126 (e.g., point (0,0)) of the top-down representation is determined based on the location of the vehicle and/or the sensor used to capture the relevant sensor data. As further depicted in FIG. 1, each of the clusters is projected onto a segment of the two-dimensional representation. Specifically, the vehicle cluster 112 is projected onto the segment 128, the right mirror cluster 114 is projected onto the segment 130, the left mirror cluster 116 is projected onto the segment 132, the proximate pedestrian cluster 118 is projected onto the segment 134, the traffic light cluster 120 is projected onto the segment 136, and the distant pedestrian cluster 122 is projected onto the segment 138.

At operation 106, the system determines an azimuth range associated with the primary cluster. The azimuth range may, for example, include a range of angles between a ray cast from the origin location of the two-dimensional representation to the projection of one side (e.g., left-most side) of the primary cluster and a ray cast from the origin location to the projection of another side (e.g., right-most side) of the primary cluster. For example, as depicted in FIG. 1, because the vehicle cluster 112 as the primary cluster is projected onto the segment 136, the azimuth range 140 for the vehicle cluster 112 includes the range of angles between: (i) a ray cast from the origin point 126 to a left side of the segment 136, and (ii) a ray cast from the origin point 126 to a right side of the segment 136.

At operation 108, the system determines a subset of the secondary clusters to exclude as ineligible for merger with the primary cluster based on the primary cluster's azimuth range. In some cases, the system maintains a secondary cluster as eligible for merger if a threshold portion (e.g., all) of the secondary cluster's projection is within the primary cluster's azimuth range. In some cases, the system excludes a secondary cluster as eligible for merger if a threshold portion (e.g., all) of the secondary cluster's projection is within the primary cluster's azimuth range.

In some cases, the system determines that a second cluster is ineligible for merger with the primary cluster if an azimuth range of the second cluster is not associated with the azimuth range of the primary cluster. In some cases, the system may determine that a second azimuth range is not associated with a first azimuth range if at least a threshold number (e.g., one, all, and/or the like) and/or a threshold ratio (e.g., all) of the points in the second azimuth range fall within the first cluster. In some cases, the system may determine that a second azimuth range is not associated with a first azimuth range if the two azimuth ranges do not intersect.

For example, as depicted in FIG. 1, azimuth range 142 is associated with the right mirror cluster 114 and azimuth range 144 is associated with the distant pedestrian cluster 122. In some cases, because a threshold portion of the azimuth range 142 falls within the azimuth range 140, the system may determine that the right mirror cluster 114 (which is projected onto the segment 130) is maintained as eligible for merger with the vehicle cluster 112.

However, as depicted in FIG. 1, because a threshold portion of the azimuth range 144 falls outsize the azimuth range 140, the system the system may determine that the distant pedestrian cluster 122 (which is projected onto the segment 138) is excluded as ineligible for merger with the vehicle cluster 112. Accordingly, the system may exclude the distant pedestrian cluster 122 from the set of secondary clusters that are eligible for merger with the vehicle cluster 112. This set of eligible secondary clusters may include the right mirror cluster 114, the left mirror cluster 116, the proximate pedestrian cluster 118, and the traffic light cluster 120.

Figure 2:
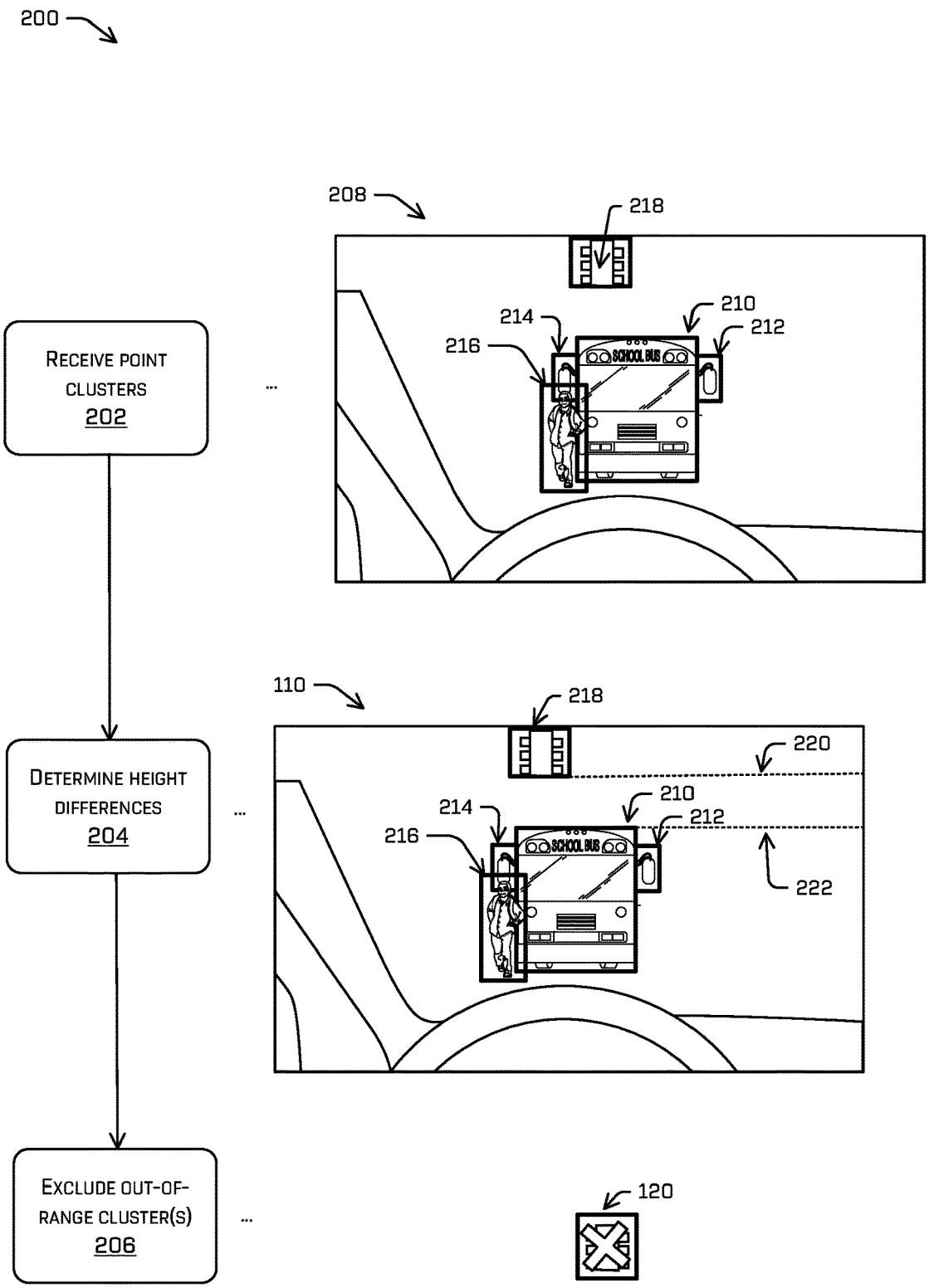
FIG. 2 is a flowchart diagram of an example process for determining which secondary clusters are ineligible for merger with a primary cluster based on height differences associated with the secondary clusters.

FIG. 2 is a flowchart diagram of an example process 200 for determining which secondary clusters are ineligible for merger with a primary cluster based on height differences associated with the secondary clusters. As depicted in FIG. 2, at operation 202, an example system receives a set of point clusters. For example, as depicted in FIG. 2, the set of clusters 208 includes the vehicle cluster 210 as the primary cluster. Moreover, the set of clusters includes the following secondary clusters: the right mirror cluster 212, the left mirror cluster 214, the proximate pedestrian cluster 216, and the traffic light cluster 218. This set of secondary clusters may be determined by excluding the secondary clusters that are outside the azimuth range of the primary cluster as ineligible for merger with that primary cluster, for example using the techniques described above in relation to process 100 of FIG. 1.

At operation 204, the system determines a height difference for each of the secondary clusters. A height difference associated with a secondary cluster may be a measure of deviation between a height value associated with the primary cluster and a height value associated with the secondary cluster. For example, in some cases, if a secondary cluster is determined to have a lower height level (e.g., be "lower than") the primary cluster, then the height difference associated with the two clusters may be determined based on a maximum height (e.g., the "top" position) associated with the secondary cluster and a minimum height (e.g., the "bottom" position) associated with the primary cluster.

As another example, in some cases, if a secondary cluster is determined to have a higher height level (e.g., be "higher than") the primary cluster, then the height difference associated with the two clusters may be determined based on a minimum height (e.g., the "bottom" position) associated with the secondary cluster and a maximum height (e.g., the "top" position) associated with the primary cluster. For example, as depicted in FIG. 1, because the traffic light cluster 218 is determined to have a higher height level than the vehicle cluster 210, then the height difference associated with those two clusters is determined based on the minimum height 220 associated with the traffic light cluster 218 and the maximum height 222 associated with the vehicle cluster 210.

At operation 206, the system determines a subset of the secondary clusters to exclude as ineligible for merger with the primary cluster based on the determined height differences. In some cases, if the height difference associated with a secondary cluster falls below a threshold, then the system may maintain the secondary cluster as eligible for merger with the primary cluster. For example, as depicted in FIG. 2, the system may determine that the height difference associated with the vehicle cluster 210 and the right mirror cluster 212, the height difference associated with the vehicle cluster 210 and the left mirror cluster 214, and the height difference associated with the vehicle cluster 210 and the proximate pedestrian cluster 216 fall below a threshold. Accordingly, the system may maintain the right mirror cluster 212, the left mirror cluster 214, and the proximate pedestrian cluster 216 as eligible for merger with the vehicle cluster 210.

In some cases, if the height difference associated with a secondary cluster equals or exceeds a threshold, then the system may exclude the secondary cluster as ineligible for merger with the primary cluster. For example, as depicted in FIG. 2, because the height difference associated with the traffic light cluster 218 and the vehicle cluster 210 falls below a threshold, the system may exclude the traffic light cluster 218 as ineligible for merger with the vehicle cluster 210.

Figure 3:
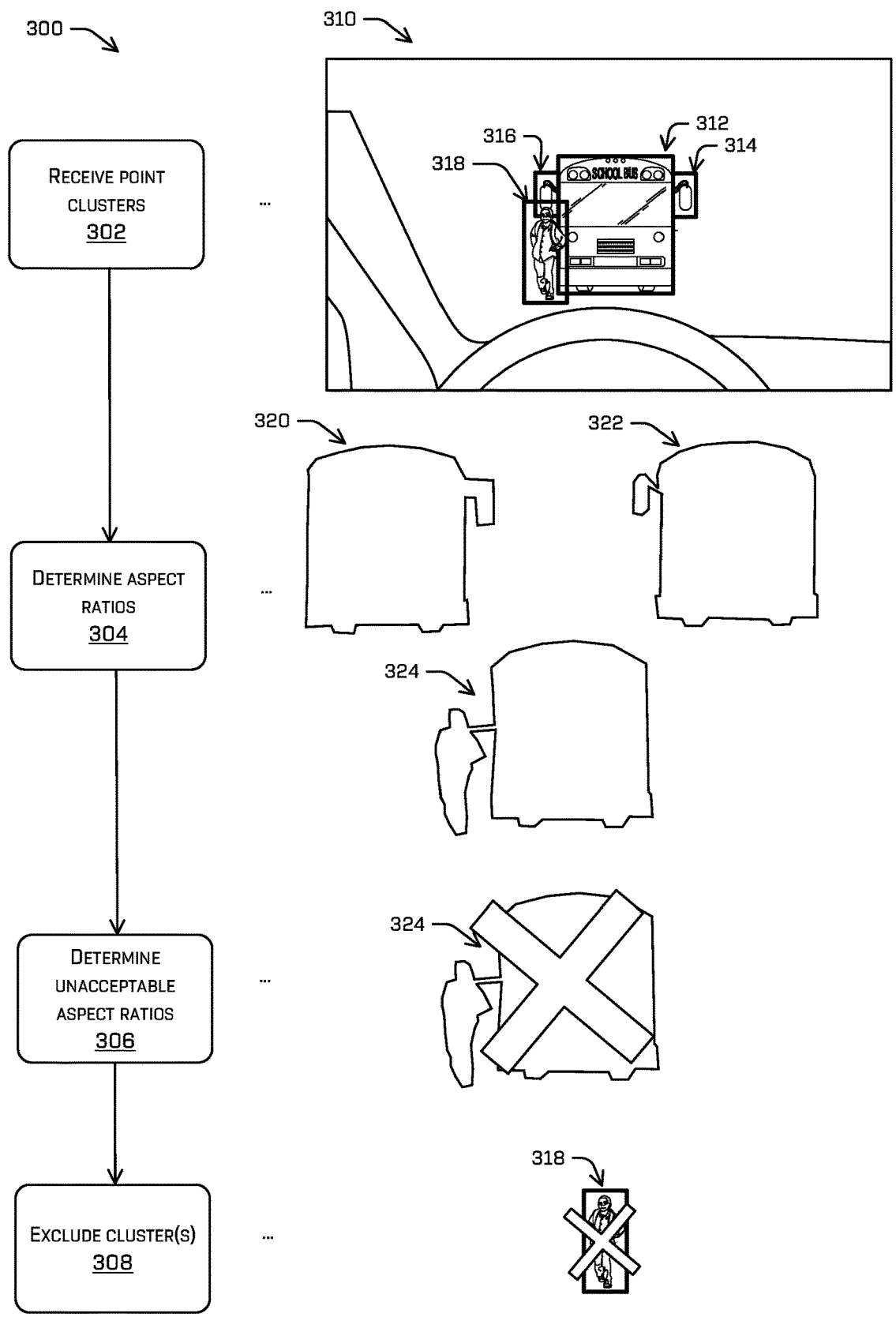
FIG. 3 is a flowchart diagram of an example process for determining which secondary clusters are ineligible for merger with a primary cluster based on aspect ratios associated with the secondary clusters.

FIG. 3 is a flowchart diagram of an example process 300 for determining which secondary clusters are ineligible for merger with a primary cluster based on aspect ratios associated with the secondary clusters. As depicted in FIG. 2, at operation 302, an example system receives a set of point clusters. For example, as depicted in FIG. 3, the set of clusters 310 includes the vehicle cluster 312 as the primary cluster. Moreover, the set of clusters includes the following secondary clusters: the right mirror cluster 314, the left mirror cluster 316, and the pedestrian cluster 318. This set of secondary clusters may be determined by excluding the secondary clusters whose height whose height differences relative to the primary cluster equals or exceeds a threshold, for example using the techniques described above in relation to process 200 of FIG. 2.

At operation 304, the system may determine an aspect ratio associated with each of the secondary clusters. In some cases, an aspect ratio associated with a secondary cluster is determined based on a ratio of two or more geometric features (e.g., a width, length, and/or height) associated with a hypothetical object determined by combining the secondary cluster and the primary cluster. Accordingly, in some cases, to determine the aspect ratio associated with a secondary cluster, the system may: (i) determine a hypothetical object that includes the primary cluster and the secondary cluster, and (ii) determine an aspect ratio associated with that hypothetical object.

For example, as depicted in FIG. 3, the system may determine the hypothetical object 320 for the right mirror cluster 314 based on a combination of the vehicle cluster 312 and the right mirror cluster 314. The aspect ratio associated with the right mirror cluster 314 may, for example, be determined based on an aspect ratio of the hypothetical object 320.

As another example, as depicted in FIG. 3, the system may determine the hypothetical object 322 for the left mirror cluster 316 based on a combination of the vehicle cluster 312 and the left mirror cluster 316. The aspect ratio associated with the left mirror cluster 316 may, for example, be determined based on an aspect ratio of the hypothetical object 322.

As another example, as depicted in FIG. 3, the system may determine the hypothetical object 324 for the pedestrian cluster 318 based on a combination of the vehicle cluster 312 and the pedestrian cluster 318. The aspect ratio associated with the pedestrian cluster 318 may, for example, be determined based on an aspect ratio of the hypothetical object 324.

At operation 306, the system may determine which secondary objects, if any, are associated with unacceptable aspect ratios. In some cases, the system may determine a secondary object is associated with an unacceptable aspect ratio if the aspect ratio associated with a combination of the secondary object and the primary object does not satisfy any acceptable aspect ratio condition. For example, as depicted in FIG. 3, the system may determine that the aspect ratio associated with the hypothetical object 324, which has resulted from combining the vehicle cluster 312 and the pedestrian cluster 318, fails to satisfy any acceptable aspect ratio condition. Accordingly, the system may determine that the pedestrian cluster 318 is associated with an unacceptable aspect ratio.

In some cases, the system may determine a secondary object is associated with an acceptable aspect ratio if the aspect ratio associated with a combination of the secondary object and the primary object does satisfies at least one acceptable aspect ratio condition. For example, the system may determine that the aspect ratio associated with the hypothetical object 320, which has resulted from combining the vehicle cluster 312 and the right mirror cluster 314, satisfies at least one acceptable aspect ratio condition. As another example, the system may determine that the aspect ratio associated with the hypothetical object 322, which has resulted from combining the vehicle cluster 312 and the left mirror cluster 316, satisfies at least one acceptable aspect ratio condition. Accordingly, the system may determine that the right mirror cluster 314 and the left mirror cluster 316 are associated with acceptable aspect ratios.

At operation 308, the system excludes any secondary clusters determined as having unacceptable aspect ratios as ineligible for merger with the primary cluster. For example, the system may exclude the pedestrian cluster 318 as ineligible for merger with the vehicle cluster 312. In some cases, the system determines any clusters determined as having acceptable ratios as eligible for merger with the primary cluster. For example, the system may determine that the right mirror cluster 314 and the left mirror cluster 316 are eligible for merger with the vehicle cluster 312. The system may then merge those eligible clusters into a single cluster with the primary cluster. For example, the system may merge the vehicle cluster 312, the right mirror cluster 314, and the left mirror cluster 316 into a single cluster, such as an enlarged vehicle cluster that includes the vehicle and its two side mirrors.

Figure 4:
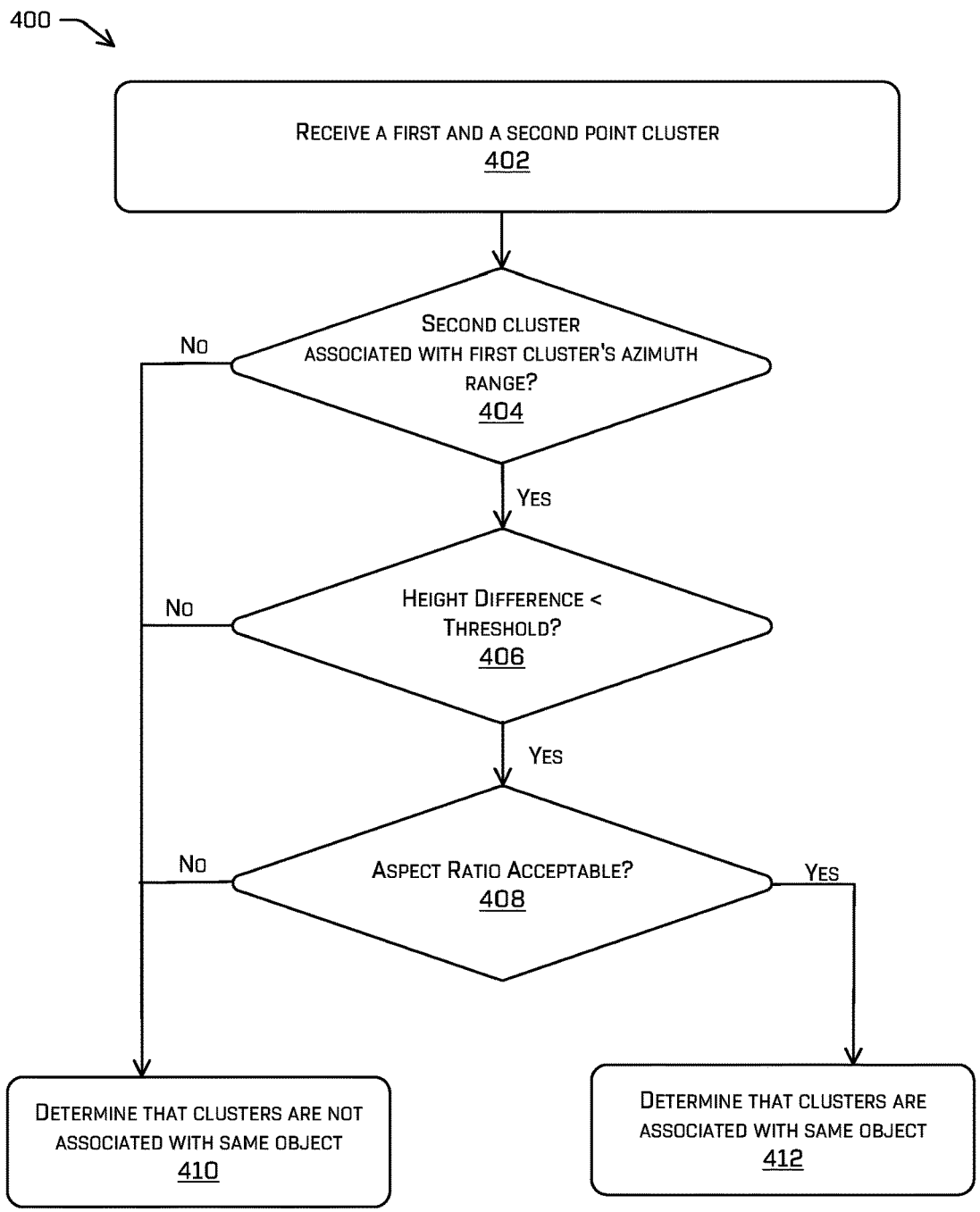
FIG. 4 is a flowchart of an example process for determining whether two clusters are associated with the same object.

FIG. 4 is a flowchart of an example process 400 for determining whether two clusters are associated with the same object. As depicted in FIG. 4, at operation 402, an example system receives a first and a second point cluster. Each point cluster may represent a collection of sensor data points (e.g., lidar points) that are grouped together (e.g., using a supervised and/or unsupervised machine learning technique). In some cases, the first and the second point cluster are determined based on sensor data associated with a single time (e.g., a single lidar scan).

At operation 404, the system determines whether a position and/or region associated with the second cluster is associated with a first azimuth range associated with the first cluster. In some cases, to determine the first azimuth range, the system projects the sensor data onto a two-dimensional plane (e.g., a top-down plane), determines a position associated with the first cluster in the two-dimensional plane, determines an origin in the two-dimensional plane based on a horizontal coordinate associated with the sensor, and determines an angular distance between two rays originating at the origin and passing either side of the first point cluster. In some cases, the first azimuth range is determined based on an area between two or more azimuth range rays. One of the two or more azimuth range rays may intersect with a defined position (e.g., sensor position) and a position associated with the first cluster (e.g., a position that is determined based on an offset distance from a position on a side of the first cluster). In some cases, the region associated with the second cluster is determined based on a second azimuth range associated with the second cluster. In some cases, the second azimuth range is determined based on an area between two or more azimuth range rays. One of the two or more azimuth range rays may intersect with a defined position (e.g., sensor position) and a position associated with the second cluster (e.g., a position that is determined based on an offset distance from a position on a side of the second cluster). In some cases, the system determines that the position associated with the second cluster is associated with the first azimuth range if a distance (e.g., a shortest distance) associated with the position and the first azimuth range falls below a threshold. In some cases, the system determines that the region associated with the second cluster is associated with the first azimuth range if a threshold number of and/or a threshold ratio of the points associated with the region fall within and/or are sufficiently proximate to the first azimuth range. In some cases, a point is determined to be "sufficiently proximate" to a region (e.g., to an azimuth range) if a shortest distance between the point and the point(s) associated with the region falls below a threshold.

If the system determines that the second cluster is not within the azimuth range associated with the first cluster (operation 404—No), the system proceeds to operation 410 to determine that the two clusters are not associated with the same object. However, if the system determines that the second cluster is within the azimuth range associated with the first cluster (operation 404—Yes), the system proceeds to operation 406.

At operation 406, the system determines whether a height difference associated with the two clusters falls below a threshold. The height difference may be determined based on a first height value associated with the first cluster and a second height value associated with the second cluster. In some cases, the first height value is determined based on a minimum height of the first point cluster and the second height value is determined based on a maximum height of the second point cluster.

If the system determines that the height difference associated with the two clusters equals or exceeds the threshold (operation 406—No), the system proceeds to operation 410 to determine that the two clusters are not associated with the same object. However, if the system determines that the height difference associated with the two clusters falls below the threshold (operation 406—Yes), the system proceeds to operation 408.

At operation 408, the system determines whether an aspect ratio associated with the combination of the two clusters falls within an acceptable aspect ratio range. In some cases, the system may identify a set of acceptable aspect ratio ranges for a set of object categories. In some cases, if an aspect ratio associated with the combination of two clusters falls within one of those ranges, the system may determine that the combination is associated with an acceptable aspect ratio.

If the system determines that the aspect ratio associated with the combination of the two clusters falls outside all acceptable aspect ratio ranges (operation 408—No), the system proceeds to operation 410 to determine that the two clusters are not associated with the same object. However, if the system determines that the aspect ratio associated with the combination of the two clusters falls within at least one acceptable aspect ratio range (operation 408—Yes), the system proceeds to operation 412 to determine that the two clusters are associated with the same object. The system may then merge the two clusters into a single cluster.

Figure 5:
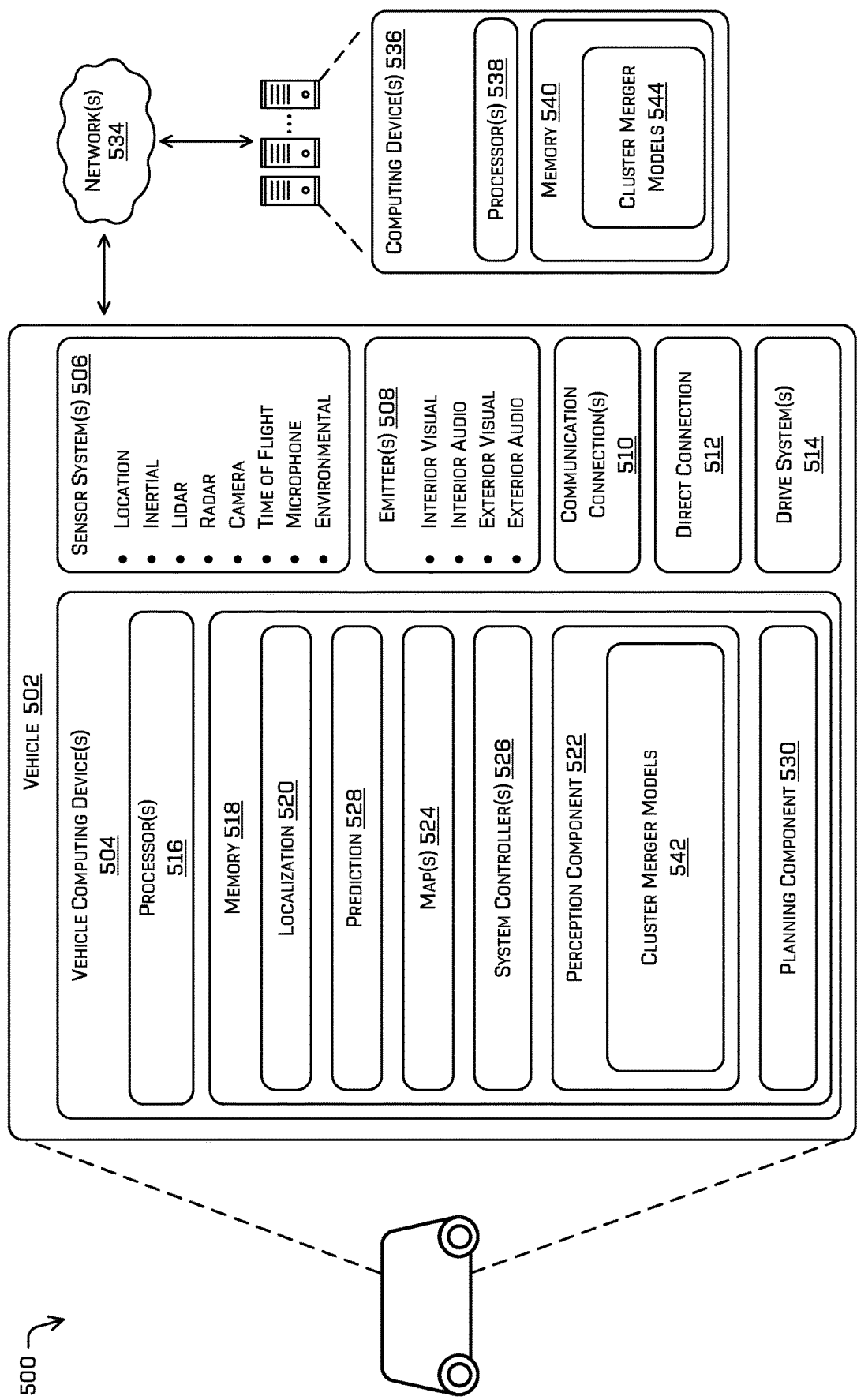
FIG. 5 depicts a block diagram of an example system for implementing various techniques described herein.

FIG. 5 depicts a block diagram of an example system 500 for implementing various techniques described herein. In some instances, the example system 500 may include a vehicle 502. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 502 can be configured to perform various techniques described herein, including detecting sensor data inconsistencies by comparing the sensor data in overlapping regions captured by different sensors. The vehicle 502 also may be configured to determine causes of sensor data inaccuracies and/or responses by the vehicle 502 to the sensor data inaccuracies, using the various techniques described herein.

The vehicle 502 may include vehicle computing device(s) 504, sensor(s) 506, emitter(s) 508, network interface(s) 510, at least one direct connection 512 (e.g., for physically coupling with the vehicle to exchange data and/or to provide power), and one or more drive system(s) 514. The system 500 may additionally or alternatively comprise vehicle computing device(s) 504.

In some instances, the sensor(s) 506 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 536.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, and/or the like), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns, and/or the like) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive systems(s) 514. Also, the network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 536. In some examples, computing device(s) 536 may comprise one or more nodes of a distributed computing system (e.g., a cloud computing architecture).

The network interface(s) 510 may include physical and/or logical interfaces for connecting the vehicle computing device(s) 504 to another computing device or a network, such as network(s) 534. For example, the network interface(s) 510 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 504 and/or the sensor(s) 506 may send sensor data, via the network(s) 534, to the computing device(s) 536 at a particular frequency, after a lapse of a predetermined period of time, in near real-time, etc.

In some instances, the vehicle 502 may include one or more drive systems(s) 514 (or drive components). In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive systems(s) 514 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 514. In some cases, the sensor(s) on the drive systems(s) 514 may overlap or supplement corresponding systems of the vehicle 502 (e.g., sensor(s) 506).

The drive systems(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 514 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 514. Furthermore, the drive systems(s) 514 may also include one or more communication connection(s) that enable communication by the respective drive component with one or more other local or remote computing device(s).

The vehicle computing device(s) 504 may include processor(s) 516 and memory 518 communicatively coupled with the one or more processors 516. Computing device(s) 536 may also include processor(s) 538, and/or memory 540. As described above, the memory 540 of the computing device(s) 536 may store and execute a set of cluster merger models 544 configured to determine whether two or more clusters are associated with the same object, for example using the techniques described herein.

The processor(s) 516 and/or 538 may be any suitable processor capable of executing computer-executable instructions to process data and perform operations as described herein. By way of example and not limitation, the processor(s) 516 and/or 538 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 518 and/or 540 may be examples of non-transitory computer-readable media. The memory 518 and/or 540 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and/or memory 540 may store a localization component 520, perception component 522, maps 524, system controller(s) 526, prediction component 528, and/or planning component 530.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include map(s) of an environment and can continuously determine a location, velocity, and/or orientation of the autonomous vehicle within the map(s). In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the planning component 530 and/or to the prediction component 528, a location and/or orientation of the vehicle 502 relative to the environment and/or sensor data associated therewith.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 524 may include at least one map (e.g., images and/or a mesh) generated in accordance with the techniques discussed herein. In some examples, the vehicle 502 can be controlled based at least in part on the maps 524. That is, the maps 524 can be used in connection with the localization component 520, the perception component 522, and/or the planning component 530 to determine a location of the vehicle 502, identify objects in an environment, and/or generate routes and/or trajectories to navigate within an environment.

In some instances, the perception component 522 may comprise a primary perception system and/or a prediction system implemented in hardware and/or software. The perception component 522 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 522 may be referred to as perception data. The perception component may include and/or execute in an online manner the operations of a set of cluster merger models 542 configured to determine whether two or more clusters are associated with the same object, for example using the techniques described herein.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 528 may include functionality to generate predicted information associated with objects in an environment. As an example, the prediction component 528 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 528 can generate one or more predicted positions, predicted velocities, predicted trajectories, etc., for such target objects based on attributes of the target object and/or other objects proximate the target object.

The planning component 530 may receive a location and/or orientation of the vehicle 502 from the localization component 520, perception data from the perception component 522, and/or predicted trajectories from the prediction component 528, and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 526 and/or drive systems(s) 514 may parse/cause to be carried out, second instructions for the emitter(s) 508 may be formatted according to a second format associated therewith). In at least one example, the planning component 530 may comprise a nominal trajectory generation subcomponent that generates a set of candidate trajectories, and selects a trajectory for implementation by the drive systems(s) 514 based at least in part on determining a cost associated with a trajectory according to U.S. patent application Ser. No. 16/517,506, filed Jul. 19, 2019 and/or U.S. patent application Ser. No. 16/862,284, filed May 11, 2020, the entirety of which are incorporated herein by reference for all purposes.

The memory 518 and/or 540 may additionally or alternatively store a mapping system (e.g., generating a map based at least in part on sensor data), a planning system, a ride management system, etc. Although localization component 520, perception component 522, the prediction component 528, the planning component 530, and/or system controller(s) 526 are illustrated as being stored in memory 518, any of these components may include processor-executable instructions, machine-learned model(s) (e.g., a neural network), and/or hardware and all or part of any of these components may be stored on memory 540 or configured as part of computing device(s) 536.

As described herein, the localization component 520, the perception component 522, the prediction component 528, the planning component 530, and/or other components of the system 500 may comprise one or more ML models. For example, the localization component 520, the perception component 522, the prediction component 528, and/or the planning component 530 may each comprise different ML model pipelines. The prediction component 528 may use a different ML model or a combination of different ML models in different circumstances. For example, the prediction component 528 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 518 may additionally or alternatively store one or more system controller(s) 526, which may be configured to control steering, propulsion, braking, safety, emitters, communication, and other systems of the vehicle 502. These system controller(s) 526 may communicate with and/or control corresponding systems of the drive systems(s) 514 and/or other components of the vehicle 502.

In an additional or alternate example, vehicle 502 and/or computing device(s) 536 may communicate (e.g., transmit and/or receive messages over network(s) 534) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 502. For example, the passenger device may additionally or alternatively comprise a display and/or one or more input/output devices, such as a touchscreen, microphone, speaker, and/or the like. In some examples, the vehicle 502 may transmit messages and/or receive messages from the passenger device.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

Conclusion

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: A system comprising: one or more processors; and one or more non-transitory computer-readable media storing computer-executable instructions that, when executed, cause the one or more processors to perform operations comprising: receiving first sensor data associated with an environment of an autonomous vehicle, wherein the first sensor data is captured by a sensor associated with the autonomous vehicle; determining a first point cluster and a second point cluster represented in the first sensor data; determining an azimuth range associated with the first point cluster; determining that the second point cluster is associated with the azimuth range; determining a first height value associated with the first point cluster; determining a second height value associated with the second point cluster; determining that a difference between the first height value and the second height value is below a threshold; determining, based on the second point cluster being within the azimuth range and the difference being below the threshold, a likelihood that the first point cluster and the second point cluster are associated with a same object in the environment; and controlling the autonomous vehicle based on the likelihood.

B: The system of paragraph A, wherein determining the likelihood further comprises: determining an aspect ratio of an object represented in a first portion of the first point cluster and a second portion of the second point cluster; and determining the likelihood based at least in part on the aspect ratio.

C: The system of paragraph A or B, wherein determining the azimuth range comprises: projecting the first sensor data onto a two-dimensional plane, wherein the two-dimensional plane is associated with a top-down representation of the environment; determining a position associated with the first point cluster in the two-dimensional plane; determining an origin in the two-dimensional plane; and determining the azimuth range based on an angular distance between two rays originating at the origin and passing either side of the first point cluster.

D: The system of any of paragraphs A-C, wherein the first height value is determined based on a minimum height of the first point cluster and the second height value is determined based on a maximum height of the second point cluster.

E: The system of any of paragraphs A-D, wherein the first sensor data is associated with a first time, and determining the likelihood comprises: receiving second sensor data associated with the environment at a second time; determining, based at least in part on the second sensor data, a third point cluster and a fourth point cluster; determining that the first point cluster is associated with a third point cluster and that the second point cluster is associated with the fourth point cluster; and increasing the likelihood based on a first position associated with the third point cluster and a second position associated with the fourth point cluster.

F: One or more non-transitory computer-readable media storing instructions executable by one or more processors, wherein the instructions, when executed, cause the one or more processors to perform operations comprising: receiving a first point cluster and a second point cluster associated with a first perspective of an environment; determining, based on the first perspective, a first geometric characteristic associated with the first point cluster; determining, based on a second perspective, a second geometric characteristic associated with the first point cluster; determining that the second point cluster is associated with the first geometric characteristic and the second geometric characteristic; determining, based on the second point cluster being associated with the first geometric characteristic and the second geometric characteristic, a likelihood that the first point cluster and the second point cluster are associated with a same object in an environment of a vehicle; and controlling the vehicle based on the likelihood.

G: The one or more non-transitory computer-readable media of paragraph F, wherein: the first geometric characteristic is associated with a first height value associated with the first point cluster; and determining that the second point cluster is associated with the first geometric characteristic comprises: determining a second height value associated with the second point cluster; determining that a difference between the first height value and the second height value is below a threshold; and determining that the difference is below the threshold.

H: The one or more non-transitory computer-readable media of paragraph F or G, wherein the first geometric characteristic is associated with an aspect ratio of an object represented in a first portion of the first point cluster and a second portion of the second point cluster.

I: The one or more non-transitory computer-readable media of paragraph H, wherein determining that the second point cluster is associated with the first geometric characteristic comprises: determining that the aspect ratio is within a first range.

J: The one or more non-transitory computer-readable media of any of paragraphs F-I, wherein: the first point cluster is determined based on first sensor data associated with the environment; the first geometric characteristic is associated with an azimuth range; and determining the azimuth range comprises: projecting the first sensor data onto a two-dimensional plane; determining a position associated with the first point cluster in the two-dimensional plane; determining an origin in the two-dimensional plane based on a horizontal coordinate associated with a sensor;

and determining the azimuth range based on an angular distance between two rays originating at the origin and passing either side of the first point cluster.

K: The one or more non-transitory computer-readable media of paragraph J, wherein the two-dimensional plane is associated with a top-down representation of the environment.

L: The one or more non-transitory computer-readable media of any of paragraphs F-K, wherein: the first point cluster and the second point cluster are determined based on first sensor data associated with a first time; the first geometric characteristic is associated with a third point cluster determined based on second sensor data associated with the environment at a second time; determining the third point cluster comprises determining that the third point cluster is associated with the first point cluster; and determining that the second point cluster is associated with the first geometric characteristic comprises: determining a fourth point cluster associated with the second point cluster based on the second sensor data; and determining that the second point cluster is associated with the first geometric characteristic based on a first position associated with the third point cluster and a second position associated with the fourth point cluster.

M: The one or more non-transitory computer-readable media of any of paragraphs F-L, the operations further comprising: determining a predicted trajectory associated with the same object; and controlling the vehicle based on the predicted trajectory.

N: A method comprising: receiving a first point cluster and a second point cluster associated with a first perspective of an environment; determining, based on the first perspective, a first geometric characteristic associated with the first point cluster; determining, based on a second perspective, a second geometric characteristic associated with the first point cluster; determining that the second point cluster is associated with the first geometric characteristic and the second geometric characteristic; determining, based on the second point cluster being associated with the first geometric characteristic and the second geometric characteristic, a likelihood that the first point cluster and the second point cluster are associated with a same object in an environment of a vehicle; and controlling the vehicle based on the likelihood.

O: The method of paragraph N, wherein: the first geometric characteristic is associated with a first height value associated with the first point cluster; and determining that the second point cluster is associated with the first geometric characteristic comprises: determining a second height value associated with the second point cluster; determining that a difference between the first height value and the second height value is below a threshold; and determining that the difference is below the threshold.

P: The method of paragraph N or O, wherein the first geometric characteristic is associated with an aspect ratio of an object represented in a first portion of the first point cluster and a second portion of the second point cluster.

Q: The method of paragraph P, wherein determining that the second point cluster is associated with the first geometric characteristic comprises: determining that the aspect ratio is within a first range.

R: The method of any of paragraphs N-Q, wherein: the first point cluster is determined based on first sensor data associated with the environment; the first geometric characteristic is associated with an azimuth range; and determining the azimuth range comprises: projecting the first sensor data onto a two-dimensional plane; determining a position associated with the first point cluster in the two-dimensional plane; determining an origin in the two-dimensional plane based on a horizontal coordinate associated with a sensor; and determining the azimuth range based on an angular distance between two rays originating at the origin and passing either side of the first point cluster.

S: The method of paragraph R, wherein the two-dimensional plane is associated with a top-down representation of the environment.

T: The method of any of paragraphs N-S, wherein: the first point cluster and the second point cluster are determined based on first sensor data associated with a first time; the first geometric characteristic is associated with a third point cluster determined based on second sensor data associated with the environment at a second time; determining the third point cluster comprises determining that the third point cluster is associated with the first point cluster; and determining that the second point cluster is associated with the first geometric characteristic comprises: determining a fourth point cluster associated with the second point cluster based on the second sensor data; and determining that the second point cluster is associated with the first geometric characteristic based on a first position associated with the third point cluster and a second position associated with the fourth point cluster.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
   one or more processors; and
   one or more non-transitory computer-readable media storing computer-executable instructions that, when executed, cause the one or more processors to perform operations comprising:
   receiving first sensor data associated with an environment of an autonomous vehicle, wherein the first sensor data is captured by a sensor associated with the autonomous vehicle;
   determining a first point cluster and a second point cluster represented in the first sensor data;
   determining an azimuth range associated with the first point cluster;
   determining that the second point cluster is associated with the azimuth range;
   determining a first height value associated with the first point cluster;
   determining a second height value associated with the second point cluster;
   determining that a difference between the first height value and the second height value is below a threshold;
   determining, based on the second point cluster being within the azimuth range and the difference being below the threshold, a likelihood that the first point cluster and the second point cluster are associated with a same object in the environment; and
   controlling the autonomous vehicle based on the likelihood.

2. The system of claim 1, wherein determining the likelihood further comprises:
   determining an aspect ratio of an object represented in a first portion of the first point cluster and a second portion of the second point cluster; and determining the likelihood based at least in part on the aspect ratio.

3. The system of claim 1, wherein determining the azimuth range comprises:
   projecting the first sensor data onto a two-dimensional plane, wherein the two-dimensional plane is associated with a top-down representation of the environment;
   determining a position associated with the first point cluster in the two-dimensional plane;
   determining an origin in the two-dimensional plane; and
   determining the azimuth range based on an angular distance between two rays originating at the origin and passing either side of the first point cluster.

4. The system of claim 1, wherein the first height value is determined based on a minimum height of the first point cluster and the second height value is determined based on a maximum height of the second point cluster.

5. The system of claim 1, wherein the first sensor data is associated with a first time, and determining the likelihood comprises:
   receiving second sensor data associated with the environment at a second time;
   determining, based at least in part on the second sensor data, a third point cluster and a fourth point cluster;
   determining that the first point cluster is associated with a third point cluster and that the second point cluster is associated with the fourth point cluster; and
   increasing the likelihood based on a first position associated with the third point cluster and a second position associated with the fourth point cluster.

6. One or more non-transitory computer-readable media storing instructions executable by one or more processors, wherein the instructions, when executed, cause the one or more processors to perform operations comprising:
   receiving a first point cluster and a second point cluster associated with a first perspective of an environment;
   determining, based on the first perspective, a first geometric characteristic associated with the first point cluster;
   determining, based on a second perspective, a second geometric characteristic associated with the first point cluster;
   determining that the second point cluster is associated with the first geometric characteristic and the second geometric characteristic;
   determining, based on the second point cluster being associated with the first geometric characteristic and the second geometric characteristic, a likelihood that the first point cluster and the second point cluster are associated with a same object in an environment of a vehicle; and
   controlling the vehicle based on the likelihood.

7. The one or more non-transitory computer-readable media of claim 6, wherein:
   the first geometric characteristic is associated with a first height value associated with the first point cluster; and
   determining that the second point cluster is associated with the first geometric characteristic comprises:
      determining a second height value associated with the second point cluster;
      determining that a difference between the first height value and the second height value is below a threshold; and
      determining that the difference is below the threshold.

8. The one or more non-transitory computer-readable media of claim 6, wherein the first geometric characteristic is associated with an aspect ratio of an object represented in a first portion of the first point cluster and a second portion of the second point cluster.

9. The one or more non-transitory computer-readable media of claim 8, wherein determining that the second point cluster is associated with the first geometric characteristic comprises:
   determining that the aspect ratio is within a first range.

10. The one or more non-transitory computer-readable media of claim 6, wherein:
    the first point cluster is determined based on first sensor data associated with the environment;
    the first geometric characteristic is associated with an azimuth range; and
    determining the azimuth range comprises:
       projecting the first sensor data onto a two-dimensional plane;
       determining a position associated with the first point cluster in the two-dimensional plane;
       determining an origin in the two-dimensional plane based on a horizontal coordinate associated with a sensor; and
       determining the azimuth range based on an angular distance between two rays originating at the origin and passing either side of the first point cluster.

11. The one or more non-transitory computer-readable media of claim 10, wherein the two-dimensional plane is associated with a top-down representation of the environment.

12. The one or more non-transitory computer-readable media of claim 6, wherein:
    the first point cluster and the second point cluster are determined based on first sensor data associated with a first time;
    the first geometric characteristic is associated with a third point cluster determined based on
    second sensor data associated with the environment at a second time;
    determining the third point cluster comprises determining that the third point cluster is associated with the first point cluster; and
    determining that the second point cluster is associated with the first geometric characteristic comprises:
       determining a fourth point cluster associated with the second point cluster based on the second sensor data; and
       determining that the second point cluster is associated with the first geometric characteristic based on a first position associated with the third point cluster and a second position associated with the fourth point cluster.

13. The one or more non-transitory computer-readable media of claim 6, the operations further comprising:
    determining a predicted trajectory associated with the same object; and
    controlling the vehicle based on the predicted trajectory.

14. A method comprising:
    receiving a first point cluster and a second point cluster associated with a first perspective of an environment;
    determining, based on the first perspective, a first geometric characteristic associated with the first point cluster;
    determining, based on a second perspective, a second geometric characteristic associated with the first point cluster;

determining that the second point cluster is associated with the first geometric characteristic and the second geometric characteristic;
determining, based on the second point cluster being associated with the first geometric characteristic and the second geometric characteristic, a likelihood that the first point cluster and the second point cluster are associated with a same object in an environment of a vehicle; and
controlling the vehicle based on the likelihood.

15. The method of claim 14, wherein:
the first geometric characteristic is associated with a first height value associated with the first point cluster; and
determining that the second point cluster is associated with the first geometric characteristic comprises:
  determining a second height value associated with the second point cluster;
  determining that a difference between the first height value and the second height value is below a threshold; and
  determining that the difference is below the threshold.

16. The method of claim 14, wherein the first geometric characteristic is associated with an aspect ratio of an object represented in a first portion of the first point cluster and a second portion of the second point cluster.

17. The method of claim 16, wherein determining that the second point cluster is associated with the first geometric characteristic comprises:
determining that the aspect ratio is within a first range.

18. The method of claim 14, wherein:
the first point cluster is determined based on first sensor data associated with the environment;
the first geometric characteristic is associated with an azimuth range; and
determining the azimuth range comprises:
  projecting the first sensor data onto a two-dimensional plane;
  determining a position associated with the first point cluster in the two-dimensional plane;
  determining an origin in the two-dimensional plane based on a horizontal coordinate associated with a sensor; and
  determining the azimuth range based on an angular distance between two rays originating at the origin and passing either side of the first point cluster.

19. The method of claim 18, wherein the two-dimensional plane is associated with a top-down representation of the environment.

20. The method of claim 14, wherein:
the first point cluster and the second point cluster are determined based on first sensor data associated with a first time;
the first geometric characteristic is associated with a third point cluster determined based on
second sensor data associated with the environment at a second time;
determining the third point cluster comprises determining that the third point cluster is associated with the first point cluster; and
determining that the second point cluster is associated with the first geometric characteristic comprises:
  determining a fourth point cluster associated with the second point cluster based on the second sensor data; and
  determining that the second point cluster is associated with the first geometric characteristic based on a first position associated with the third point cluster and a second position associated with the fourth point cluster.

* * * * *